Hecker & Hotine,
Bread Machine,

Nº 23,301. Patented Mar. 22, 1859.

Witnesses:
Geo. D. Sargeant
Wm H. Bishop

Inventors:
John Hecker
William Hotine

UNITED STATES PATENT OFFICE.

JNO. HECKER AND WM. HOTINE, OF NEW YORK, N. Y.

DOUGH-ROLLING MACHINE.

Specification of Letters Patent No. 23,301, dated March 22, 1859.

*To all whom it may concern:*

Be it known that we, JOHN HECKER and WILLIAM HOTINE, of the city, county, and State of New York, have invented certain new and useful Improvements in Machinery for Working and Rolling Dough for Making Bread; and we do hereby declare that the following is a full, clear, and exact description thereof, reference being had to the accompanying drawings, making part of this specification, in which—

Figure 1:
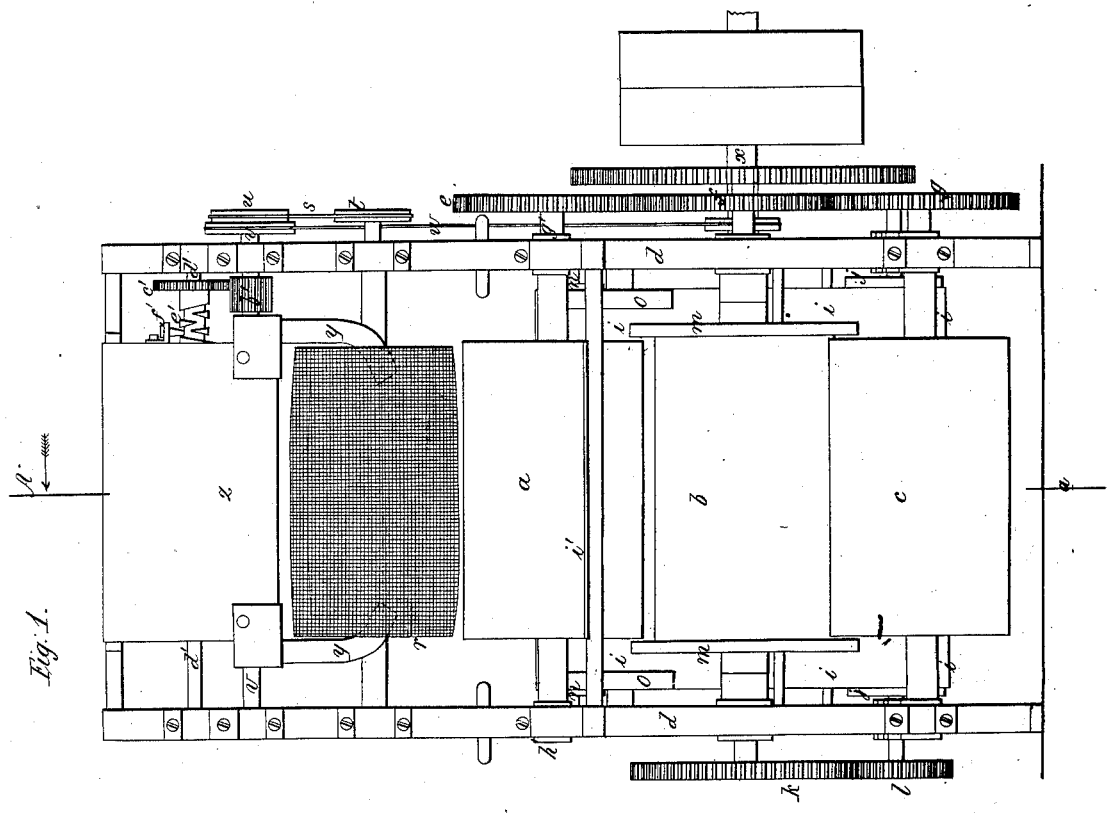
Figure 2:
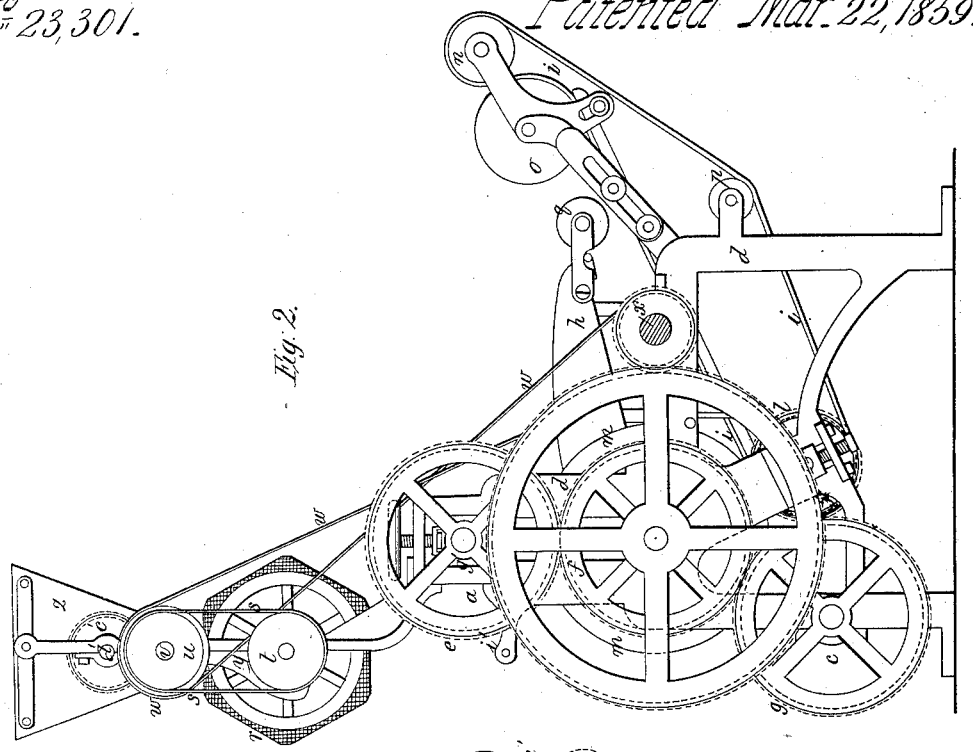

Figure 1, is a back elevation of the machine; Fig. 2, a side elevation; and Fig. 3, a vertical section taken at the line A, *a* of Fig. 1.

The same letters indicate like parts in all the figures.

The object of our said invention is to thoroughly roll and work dough after it has been mixed, and to produce it, after it has been worked, in a sheet of uniform thickness from which it can be cut into loaves and readily transferred to the oven. And by the use of our said machine a batch of dough placed on a feed table is rolled between a middle and an upper cylinder, and then returned between the said middle and a lower cylinder to the same side of the machine and delivered onto an endless apron which elevates it, rolls it up and delivers it onto the feed table to be again passed between the cylinders, or delivers it where required to be cut into loaves; and during these operations the surface of the dough is regularly sprinkled with flour to facilitate the rolling.

In the accompanying drawings (*a*, *b*, *c*,) represent three parallel cylinders, mounted in a suitable frame (*d*) and rotated with equal velocity in the directions indicated by the arrows, (see Fig. 3,) the middle one (*b*) receiving motion from the driving shaft (*x*) by suitable gearing represented, or in any other suitable manner; the shafts of the three being geared together by three cog wheels (*e*, *f*, *g*,) of equal diameter.

The dough to be rolled is placed on a feed table (*h*) which is a little below the bite of the middle and upper cylinders which, by their rotation, take the dough from the table and roll it into a sheet which is carried by the rotation of the middle cylinder down to the bite of the middle and lower cylinder and by them returned to the front side of the machine and delivered onto a moving endless apron (*i*). This apron (*i*) we prefer to make of thick duck, although it may be made of other material. It passes around a roller (*j*) which receives motion from a wheel (*k*) on the cylinder (*b*) engaging a pinion (*l*) on its shaft making it travel slightly faster than the periphery of the middle cylinder (*b*). It is wider than the length of the cylinder (*b*) and on the shaft of this cylinder there are two wheels (*m*, *m*,) one at each end which are free to turn on the shaft and forming end flanches to this said cylinder, the periphery of the said flanch wheels rolling on the surface of the said apron during the operation of the machine. From the roller (*j*) the apron runs up in front of the machine at a considerable angle, as represented, and around a guide roller (*n*) in front of, and higher than the feed table, and in front of the front end of the feed table there are two guide wheels (*o*, *o*,) turning freely on journal pins projecting from the frame, and the distance between these two guide wheels should be about equal to the width of the feed table. These two guide wheels bear on the top of the apron where it passes over the roller (*n*) to cause it to bend around the roller and form a cavity in the form of a segment of a cylinder just in front of the feed table. The under part of the said apron may be distended by a small roller (*p*).

The front edge of the feed table is provided with a roller (*q*) to facilitate the passage of the dough from the apron to the table. As the sheet of dough is delivered in front by the middle and bottom cylinders it is received on the endless apron, and carried up by it, until it reaches the cavity at the roller (*n*) and by reason of the sudden curvature of the apron at this place, it (the sheet of dough) is turned over, instead of following the apron around the roller, and by reason of its being rolled over it gets onto the feed apron again, the roller (*q*) on the edge of the table facilitating its transfer, and from the feed apron, when sufficiently accumulated, it is again passed between the middle and the upper cylinders, and the middle and bottom cylinders, and by the latter again delivered onto the apron. In this way a batch of dough can be rolled any number of times, and when sufficiently rolled it is necessary for the attendant to hold the end of the sheet to the apron where it passes over the roller (*q*) to cause it to pass over to be delivered ready to be cut into loaves.

As the dough is rolled up by the apron it accumulates and then passes onto the feed table to be again carried between the cylinders. During the operations of rolling it is necessary to sprinkle dry flour over the cylinders and dough to prevent adhesion to the cylinders; for this purpose there is a rotary sieve (*r*) placed above the upper cylinder with its shaft mounted in the upper part of the frame. This sieve is rotated by a band (*s*) passing around a pulley (*t*) on the shaft of the sieve, and a corresponding pulley (*u*) on a shaft (*v*) which carries another pulley that receives a cross band (*w*) from a pulley on the driving shaft (*x*). As this sieve rotates it sprinkles flour regularly over the surface of the cylinders and the dough and thus prevents the dough from adhering to the cylinders, and it is immaterial whether the dough sticks to the middle cylinder, for when the end of the sheet of dough is once stripped from the cylinder and laid on the apron it will continue to follow that circuit.

The flour is supplied to the inside of the rotating sieve through the two open ends by means of two curved pipes (*y*, *y*) which receive it from the ends of a hopper (*z*) placed above. In the bottom of this hopper is placed a screw conductor (*a'*) having the thread running in opposite directions from the middle of its length by which the flour is conveyed in opposite directions to the two pipes (*y*, *y,*). This screw conveyer is on the shaft (*v*), and the said shaft (*v*) carries a long pinion (*b'*) which gives motion to a cog wheel (*c'*) on a shaft (*d'*) parallel with and above the screw conveyer. This shaft (*d'*) is armed with radial pins or stirrers which rotate in, and loosen the flour in the hopper above the conveyer to prevent it from aggregating into lumps. And still further to prevent the aggregation of the flour the shaft with its stirring pins receives, as it rotates, an endwise vibratory motion by means of a reverse threaded endless screw (*e'*) cut on its periphery outside the hopper, and in this double reversed thread is fitted a swivel switch (*f'*), as it is sometimes termed, which at each end of the thread is reversed to cause the shaft to traverse in the reverse direction. In this way we insure a regular supply of flour to the screen and effectually prevent the flour from matting and the hopper from choking. And as the sieve receives the flour near the ends we make it bulging like a cask that the flour may get to the middle by gravity, and thus effect an equal distribution.

The journals of the top cylinder are mounted in boxes (*g'*, *h'*) which are adjustable by means of set screws or other equivalent means to admit of adjusting the space between the two cylinders to regulate the thickness to which the dough shall be rolled first, but the distance between the middle and bottom cylinders may be fixed. And the roller (*j*) around which the endless apron passes should also be mounted in adjustable boxes. A scraper (*i'*) is applied at the back to the surface of the upper cylinder to scrape off any dough that may stick to it. And although we have described the middle cylinder as being provided with a wheel at each end, which wheels answer the purpose of flanches to the ends of the said cylinder, and we have specified that these wheels are free to turn on the shaft of the said cylinder, we having found this to be the best mode of application, nevertheless we wish it to be distinctly understood that such mode of construction is not indispensable to the practical working of our said invention, as we have produced good results without flanches, and also with the flanches firmly attached to the said cylinder. And although we have described and represented the lower of the three cylinders as being geared to move with a positive motion, this may be dispensed with, and the said cylinder may turn freely without gearing as its office is simply to act in conjunction with the middle cylinder to return the dough to the front of the machine to deliver it onto the apron. And we wish also to have it understood that the sieve and its appendages may be dispensed with, but in that case the attendant should sprinkle flour by hand, and the sieve may be used for sprinkling flour without the use of an apparatus for supplying it with flour regularly, but although such modifications may be made we have obtained the best results when using the machine as first above fully described.

Figure 3:
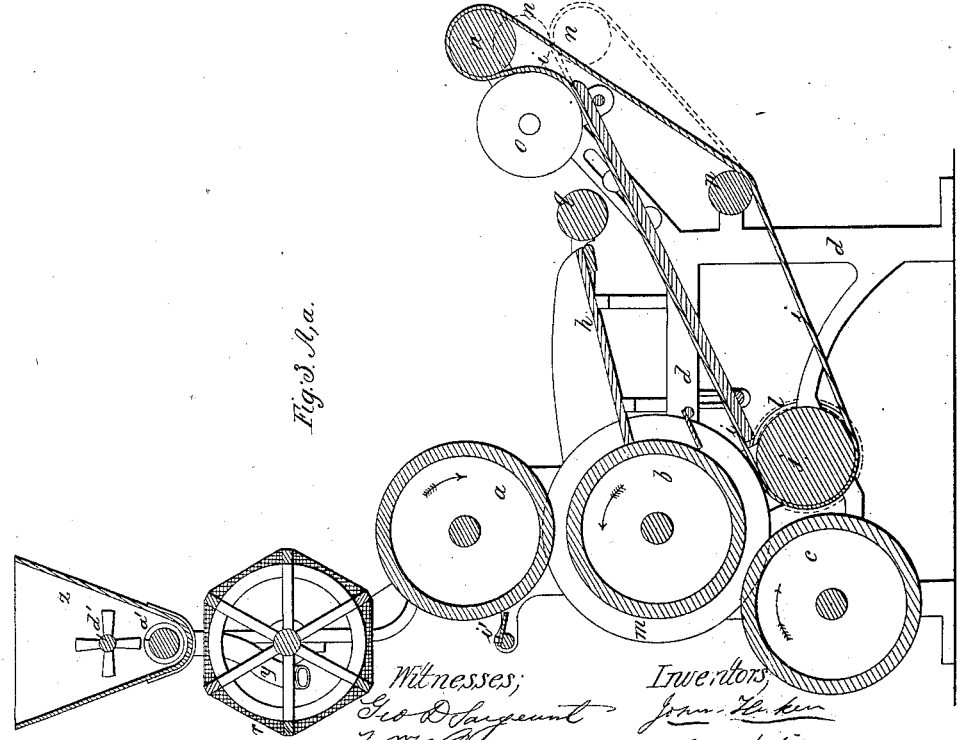

As a substitute and equivalent for the concavity in the endless apron to turn over and roll up the sheet of dough, or carry it over to deliver it, we have contemplated using the apron without the guide wheels (*o*, *o*,) in front of the roller (*n*), and have the said apron pass in a straight plane to the top of the roller (*n*) and thence around it, as represented by dotted lines in Fig. 3 of the accompanying drawings, and placing another roller (*n'*) above the roller (*n*) and apron, so that the end of the sheet of dough in moving upward with the apron strikes against the said roller (*n'*) and will be turned over and rolled up or carried over just as it would be by the curved part of the apron before described. And we have also contemplated dispensing with the roller (*j*) and carrying the apron directly around the lower cylinder (*c*) in which case it should be let down a little lower, say to the extent of the thickness of the apron. And, however applied, the surface of the apron should travel about as fast as the cylinders deliver the sheet of dough. But we prefer the mode of application first described.

We do not wish to be understood as making claim to the use of cylinders for rolling dough, as these have long since been applied to the rolling of dough; but What we do claim as our invention, and desire to secure by Letters Patent, is—

1. The combination of an inclined endless apron for receiving and returning the dough, substantially as described, in combination with the cylinders for rolling the dough, substantially as described.

2. We also claim in the above combination the curving in of the apron around the upper roller, or the equivalent thereof, substantially as described, for the purpose of returning the dough to the feed table, substantially as described, in combination with the cylinders for rolling the dough, as described.

3. And we also claim the rotating screen as described in combination with the arrangement of cylinders for rolling and working the dough, substantially as and for the purpose described.

4. And finally we claim in combination with the rotating screen, as described, the hopper and apparatus therein for insuring a regular supply of flour, as set forth.

JOHN HECKER.
WILLIAM HOTINE.

Witnesses:
GEO. D. SARGEANT,
WM. H. BISHOP.